(12) United States Patent
Jee et al.

(10) Patent No.: US 11,136,078 B2
(45) Date of Patent: Oct. 5, 2021

(54) VEHICLE TRACK SHOE PAD

(71) Applicant: Jees LLC, Schaumburg, IL (US)

(72) Inventors: Woo Young Jee, Inverness, IL (US); Dennis Hyunsuk Jee, Schaumburg, IL (US)

(73) Assignee: Jees LLC, Schaumburg, IL (US)

( * ) Notice: Subject to any disclaimer, the term of this patent is extended or adjusted under 35 U.S.C. 154(b) by 480 days.

(21) Appl. No.: 16/043,307

(22) Filed: Jul. 24, 2018

(65) Prior Publication Data

US 2020/0031410 A1    Jan. 30, 2020

(51) Int. Cl.
*B62D 55/28* (2006.01)
*B62D 55/275* (2006.01)

(52) U.S. Cl.
CPC ........... *B62D 55/28* (2013.01); *B62D 55/275* (2013.01)

(58) Field of Classification Search
CPC ....... B62D 55/28; B62D 55/26; B62D 55/275
See application file for complete search history.

(56) References Cited

U.S. PATENT DOCUMENTS

| | | | |
|---|---|---|---|
| 3,972,570 | A | 8/1976 | Massieon |
| 4,109,971 | A | 8/1978 | Black et al. |
| 5,388,900 | A | 2/1995 | Suzuki |
| 5,741,052 | A | 4/1998 | Fikse |
| RE36,025 | E | 1/1999 | Suzuki |
| 6,464,309 | B2 | 10/2002 | Doyle |
| 6,557,954 | B1 | 5/2003 | Hattori |
| 6,820,948 | B2 | 11/2004 | Katoh |
| 7,571,783 | B2 | 8/2009 | Park et al. |
| 7,673,951 | B2 * | 3/2010 | Chiang ................. B62D 55/28 305/189 |
| 7,815,262 | B2 | 10/2010 | Maeda |
| 7,900,962 | B2 | 3/2011 | Lagsdin |

(Continued)

FOREIGN PATENT DOCUMENTS

| CN | 202054071 U | 11/2011 |
|---|---|---|
| EP | 0091817 A2 | 10/1983 |

(Continued)

OTHER PUBLICATIONS

Response to Written Opinion dated Nov. 7, 2019, from International Application No. PCT/US2019/042758, dated May 19, 2020 and filed May 21, 2020, 14 pp.

(Continued)

*Primary Examiner* — Jason R Bellinger
(74) *Attorney, Agent, or Firm* — Shumaker & Sieffert, P.A.

(57) ABSTRACT

In some examples, a shoe pad for a grouser of a vehicle track defines a slot configured to receive a bracket that is configured to attach the shoe pad to a grouser. For example, a first arm of a bracket may be inserted into the slot and a second arm of the bracket may be configured to contact an interior side of a grouser of a vehicle track to attach the shoe pad to the grouser. In some examples, the shoe pad and the bracket may be held to the grouser with the aid of a bolt, which bolt may not extend through the grouser, but, rather, may merely engage with an exterior side of the grouser. In this way, the shoe pad may be able to be attached to a grouser without requiring one or more holes to be present in the grouser, while still providing a relatively tight fit with the grouser the shoe pad is configured to cover.

20 Claims, 5 Drawing Sheets

(56) References Cited

U.S. PATENT DOCUMENTS

| | | | |
|---|---|---|---|
| 2003/0038543 A1 | 2/2003 | Oberlander et al. | |
| 2006/0119175 A1 | 6/2006 | Garza | |
| 2011/0148187 A1 | 6/2011 | Lyons | |
| 2014/0246899 A1* | 9/2014 | Park | B62D 55/275 305/189 |
| 2016/0297487 A1 | 10/2016 | Thorson et al. | |
| 2017/0247070 A1 | 8/2017 | O'Neill | |

FOREIGN PATENT DOCUMENTS

| | | |
|---|---|---|
| JP | H09301233 A | 11/1997 |
| JP | 2000085641 A | 3/2000 |
| KR | 100605233 B1 | 7/2006 |

OTHER PUBLICATIONS

International Search Report and Written Opinion of counterpart International Application No. PCT/US2019/042758, dated Nov. 7, 2019, 13 pp.

International Preliminary Report on Patentability from International Application No. PCT/US2019/042758, dated Sep. 24, 2020, 6 pp.

"Bolt-On and Clip-On Rubber Artliner-BLS Track Pads," BLS Enterprises, Inc., accessed on Feb. 28, 2018, accessed from http://www.tufpads.com/trackpads_artliner.html, 2 pp.

"Clip on Rubber Track Pads," Cautrac, accessed on Feb. 28, 2018, accessed from https://www.cautrac.com/product/clip-on/, 3 pp.

"Steel Tracks, Hybrid Tracks & Track Pads for Mini Excavators," TNT, accessed on Feb. 28, 2018, accessed from http://www.digtnt.com/steel-tracks/, 5 pp.

* cited by examiner

VEHICLE TRACK SHOE PAD

TECHNICAL FIELD

The present disclosure relates to a track for a vehicle, and more particularly, a shoe pad for a vehicle track.

BACKGROUND

Many off-road vehicles, such as earthmoving vehicles (e.g., excavators, skid steer track loaders, or multi-terrain track loaders) and agricultural vehicles, include a vehicle track coupled to a drive system, which may include, for example, one or more drive sprockets. A vehicle track may help provide traction on surfaces that traditional wheels having a circular cross-section may not be able to adequately grip. For example, a vehicle with a vehicle track may bridge a greater surface area than a vehicle with two or more circular wheels, which may help the vehicle with the vehicle track traverse surfaces that the vehicle with circular wheels would not ordinarily be able to traverse, such as uneven or loose surfaces (e.g., gravel or mud).

SUMMARY

The disclosure describes devices, assemblies, and methods relating to a shoe pad for a grouser of a vehicle track, as well as relating to a vehicle track including one or more shoe pads. In some examples, a shoe pad defines a slot configured to receive a bracket that is configured to attach the shoe pad to a grouser. For example, a first arm of a bracket may be inserted into the slot and a second arm of the bracket may be configured to contact an interior side of a grouser of a vehicle track to attach the shoe pad to the grouser. The shoe pad and the bracket may be held to the grouser with the aid of a bolt. For example, the shoe pad may define a first bolt aperture and the first arm of the bracket may define a second bolt aperture configured to substantially align with the first bolt aperture when the first arm is inserted into the slot of the shoe pad. A bolt may be inserted through the first and second bolt apertures and contact the grouser to secure the shoe pad to the grouser. The bolt may not extend through the grouser, but, rather, may merely engage with the exterior side of the grouser. In this way, the shoe pad may be able to be attached to a grouser without requiring one or more holes to be present in the grouser, while still providing a relatively tight fit with the grouser the shoe pad is configured to cover.

Clause 1: In some examples, an assembly comprises a grouser defining an exterior side and an interior side; a shoe pad configured to contact the exterior side of the grouser, wherein an edge of the shoe pad defines a slot and a first bolt aperture in communication with the slot; and a bracket comprising a first arm configured to be inserted into the slot of the shoe pad and a second arm configured to contact the interior side of the grouser. The first arm defines a second bolt aperture configured to substantially align with the first bolt aperture of the shoe pad when the first arm is inserted into the slot.

Clause 2: In some examples of the assembly of clause 1, the exterior side of the grouser comprises a first exterior side and the interior side of the grouser comprises a first interior side, and the shoe pad further defines a second exterior side and a second interior side, wherein the second exterior side is configured to contact a ground surface and the second interior side is configured to contact the first exterior side of the grouser.

Clause 3: In some examples of the assembly of clause 2, the shoe pad further defines a first edge and a second edge opposite the first edge, a first axis extending between the first edge and the second edge, and a width of the slot measured from the first edge along the first axis is about 40 mm to about 115 mm.

Clause 4: In some examples of the assembly of clause 3, a length of the slot extends along a second axis orthogonal to the first axis, and the length of the slot is about 50 mm to about 150 mm.

Clause 5: In some examples of the assembly of any of clauses 2-4, a third axis extends between the second exterior side and the second interior side of the shoe pad, and the slot is about 10 mm to about 50 mm from the second exterior side along the third axis.

Clause 6: In some examples of the assembly of any of clauses 2-5, the assembly further comprises a bolt configured to be inserted through the first bolt aperture of the shoe pad and the second bolt aperture of the bracket to secure the shoe pad to the grouser.

Clause 7: In some examples of the assembly of clause 6, a third axis extends between the second exterior side and the second interior side of the shoe pad, and the first bolt aperture extends along the third axis, and a head of the bolt is configured to be within the shoe pad when the bolt is inserted through the first bolt aperture of the shoe pad and the second bolt aperture of the bracket to secure the shoe pad to the grouser.

Clause 8: In some examples of the assembly of clause 6 or 7, the bolt comprises a threaded bolt, and the shoe pad further comprises a threaded insert configured to form a threaded connection with the threaded bolt, wherein the threaded insert is positioned in the shoe pad and is communication with the slot.

Clause 9: In some examples of the assembly of any of clauses 6-8, the bolt comprises a tip portion configured to engage with the exterior side of the grouser when the bolt is inserted through the first bolt aperture of the shoe pad and the second bolt aperture of the bracket to secure the shoe pad to the grouser, wherein the tip portion does not extend through the grouser to the interior side of the grouser.

Clause 10: In some examples of the assembly of any of clauses 6-9, the edge of the shoe pad comprises a first edge, the slot comprises a first slot, the bracket comprises a first bracket, and the bolt comprises a first bolt. A second edge opposite of the first edge of the shoe pad defines a second slot and a third bolt aperture in communication with the second slot, and the assembly further comprises a second bracket comprising a third arm configured to be inserted into the second slot of the shoe pad and a fourth arm is configured to contact the interior side of the grouser. The third arm defines a fourth bolt aperture configured to substantially align with the third bolt aperture of the shoe pad when the third arm is inserted into the second slot. The assembly further comprises a second bolt configured to be inserted through the third bolt aperture of the shoe pad and the fourth bolt aperture of the bracket to secure the second edge of shoe pad to the grouser.

Clause 11: In some examples, an endless track comprises a plurality of grousers coupled together to form the endless track, wherein each grouser of the plurality of grousers defines an exterior side and an interior side; and a plurality of shoe pads, each shoe pad of the plurality of shoe pads defining a slot and a first bolt aperture in communication with the slot. Each shoe pad is secured to a respective grouser of the plurality of grousers by a respective bracket comprising a first arm configured to be inserted into the slot of the shoe pad and a second arm configured to contact the interior side of the respective grouser. The first arm defines a second bolt aperture configured to substantially align with the first bolt aperture of the respective shoe pad when the first arm is inserted into the slot.

Clause 12: In some examples of the endless track of clause 11, wherein he exterior side of each grouser comprises a first exterior side and the interior side of each grouser comprises a first interior side, and each shoe pad further defines a second exterior side and a second interior side, wherein the second exterior side is configured to contact a ground surface and the second interior side is configured to contact the first exterior side of the respective grouser.

Clause 13: In some examples of the endless track of clause 11 or 12, each shoe pad further defines a first edge and a second edge opposite the first edge, and a first axis extends between the first edge and the second edge. A width of the slot width measured from the first edge along the first axis is about 40 mm to about 115 mm.

Clause 14: In some examples of the endless track of clause 13, a length of the slot extends along a second axis orthogonal to the first axis, and the length of the slot is about 50 mm to about 150 mm.

Clause 15: In some examples of the endless track of any of clauses 12-14, a third axis extends between the second exterior side and the second interior side of the respective shoe pad, and the slot is about 10 mm to about 50 mm from the second exterior side along the third axis.

Clause 16: In some examples of the endless track of clause 15, each shoe pad is secured to the respective grouser of the plurality of grousers by a bolt configured to be inserted through the first bolt aperture of the respective shoe pad and the second bolt aperture of the bracket. The first bolt aperture extends along the third axis, and a head of the bolt is configured to be within the shoe pad when the bolt is inserted through the first bolt aperture of the shoe pad and the second bolt aperture of the bracket.

Clause 17: In some examples of the endless track of clause 16, the bolt comprises a threaded bolt, and each shoe pad comprises a threaded insert configured to form a threaded connection with the threaded bolt, wherein the threaded insert is positioned in the shoe pad and is communication with the slot.

Clause 18: In some examples of the endless track of clause 16 or 17, the bolt comprises a tip portion configured to engage with the exterior side of the respective grouser when the bolt is inserted through the first bolt aperture of the respective shoe pad and the second bolt aperture of the bracket to secure the respective shoe pad to the respective grouser. The tip portion does not extend through the respective grouser to the interior side of the grouser.

Clause 19: In some examples, a method comprises placing a shoe pad on an exterior side of a grouser, wherein the grouser defines the exterior side and an interior side, and wherein the shoe pad defines a slot and a first bolt aperture in communication with the slot; and attaching a bracket to the shoe pad and the grouser, wherein the bracket comprises a first arm configured to be inserted into the slot of the shoe pad and a second arm configured to contact the interior side of the grouser. The first arm defines a second bolt aperture configured to substantially align with the first bolt aperture of the shoe pad when the first arm is inserted into the slot.

Clause 20: In some examples of the method of clause 19, the method further comprises inserting a bolt through the first bolt aperture of the shoe pad and the second bolt aperture of the bracket to secure the shoe pad to the grouser.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
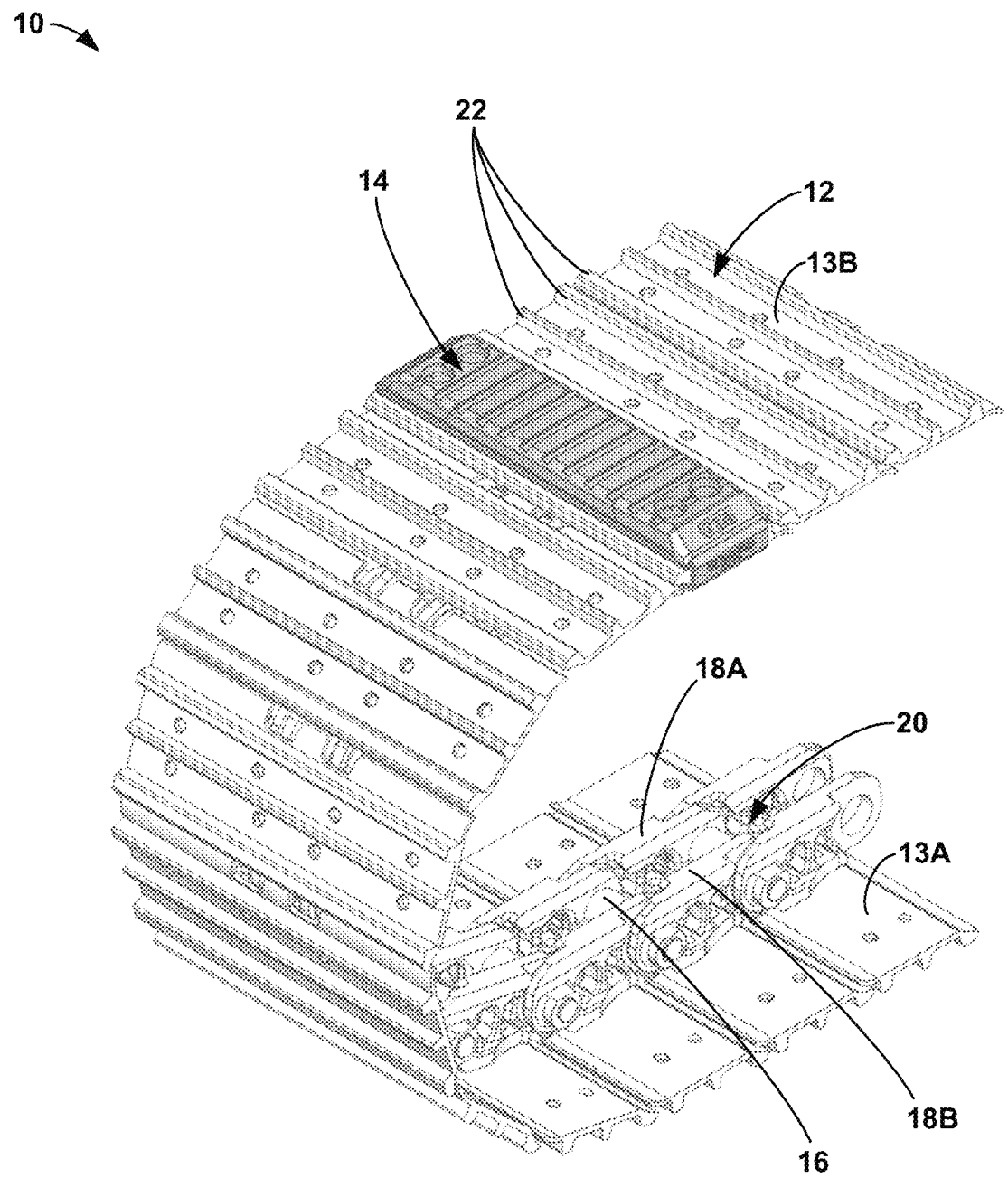
FIG. 1 is a perspective view of a part of an example vehicle track that includes a plurality of grousers and a plurality of shoe pads.

The disclosure describes devices, assemblies, and methods relating to a shoe pad for a grouser, as well as relating to a vehicle track including one or more shoe pads. In some examples, a vehicle track may include a plurality of interconnected grousers, such as metal grousers. The grousers may be mechanically connected together to define a closed track. The joints between the grousers may enable the grousers to move relative to an adjacent grouser, e.g., to change the angle between adjacent grousers as the vehicle track rotates. This may enable the vehicle track to be flexible and maintain an elliptical shape.

The grousers of the vehicle track may define one or more protrusions configured to engage with a ground surface to increase the traction of the vehicle track. In some cases, these protrusions or other parts of the grousers may damage a ground surface, provide a vehicle mounted on the metal vehicle track with a relatively rough ride, or the like. In some such examples, one or more shoe pads may be attached to a ground contact surface of one or more grousers of the vehicle track to help minimize adverse effects on the ground surface, to provide the vehicle mounted on the metal vehicle track with a smoother ride, or the like.

Some shoe pads may be bolted to a grouser or clipped onto a grouser. For example, a bolt-on shoe pad may be configured to be bolted through a grouser. In some such examples, the shoe pad may include a plurality of bolts configured to be inserted through a corresponding plurality of apertures (e.g., through-holes) defined by the grouser. A manufacturer of the grouser may not design the grouser to be used with such a shoe pad, such that the original grouser formed by the manufacturer may not define a corresponding plurality of apertures configured to receive the shoe pad attachment bolt. Thus, a grouser may need to be modified in order for the bolt-on shoe pad to be attached via a plurality of bolts, which may be time consuming and add an expense. In this way, some bolt-on shoe pads, such as after-market shoe pads (e.g., shoe pads configured to be attached to the grouser after manufacture of the grouser or vehicle track including the grouser) may be difficult and/or expensive to use with a variety of types of grousers, as the bolt-on shoe pads may be configured to be attached to a specific type of grouser defining a particular arrangement of apertures.

A clip-on shoe pad may be configured to be secured to a grouser via an interference fit. For example, the shoe pad may include clips or channels that are configured to engage an interior side of a grouser to attach the shoe pad to the grouser. Clip-on shoe pads may only attach to the grouser via an interference fit, without using a bolt or another connection mechanism to secure the shoe pad to the grouser. Over time, the interference fit between the shoe pad and grouser may decrease, and, as a result, the clip-on shoe pad may loosen from the grouser, which may adversely affect the performance of the vehicle track (e.g., decreasing the stability of the vehicle track). In addition, the reduction in interference fit between the clip-on shoe pad and the grouser may cause the shoe pad to be replaced prematurely, e.g., before the ground surface of the shoe pad wears out.

In contrast to the bolt-on or clip-on shoe pads described above, the shoe pads described herein are configured to be securely attached to a grouser without requiring bolt apertures in the grouser itself, which may enable the shoe pads to be retrofit onto a variety of types of grousers. In addition, a bolt that engages with the grouser, but does not extend through the grouser, may be used to help fix the shoe pad relative to the grouser, which may help maintain a relatively tight fit between the shoe pad and the grouser over time, even through the use of the vehicle track on relatively rough surface conditions.

The shoe pads described herein are each configured to cover an exterior side (e.g., ground contact surface) of a grouser. The shoe pads may be secured to the grouser using a bracket. In some examples, one or more bolts may also be used to secure the shoe pad to the grouser. The bracket may be configured to be inserted into the shoe pad and contact an interior side of the grouser, and the one or more bolts may be configured to be inserted through a bolt aperture of the shoe pad and a bolt aperture of the bracket. In some examples, the bolt may contact and engage with the exterior side of the metal grouser without extending through the metal grouser, e.g., without requiring a bolt aperture in the metal grouser itself. In this way, the shoe pads described herein may be securely attached to a grouser without requiring bolt apertures in the grouser, and may maintain the secure attachment over time. In turn, the shoe pads may be able to be retrofit on many different types of grousers, may have a longer useful life, may be less expensive to manufacture, may be less time-consuming to manufacture, or the like in comparison to bolt-on or clip-on shoe pads.

In some examples, the shoe pad described herein defines a slot and a first bolt aperture in communication with the slot. The shoe pad may be placed on the exterior side of a grouser, and a first arm of a bracket may be inserted into the slot of the shoe pad. A second arm of the bracket may be configured to contact an interior side of the grouser to attach the shoe pad to the grouser. The first arm of the bracket may define a second bolt aperture configured to substantially align with the first bolt aperture when the first arm is inserted into the slot of the shoe pad, and a bolt may be inserted through the first and second bolt apertures to engage with a surface the grouser (without extending through a thickness of the grouser) to secure the shoe pad to the grouser. In this way, the shoe pad described herein may be able to be attached to a grouser without requiring one or more pre-formed holes to be present in the grouser, while still providing a relatively tight fit with the grouser. In some examples, each grouser of a plurality of interconnected grousers forming a vehicle track may be covered with a respective shoe pad to provide a vehicle mounted on the vehicle track with a smoother ride, help prevent damage to the ground surface, or the like.

FIG. 1 is a perspective view of a part of an example vehicle track 10 that includes a plurality of grousers 12 and a plurality of shoe pads 14 (only one shoe pad of the plurality of shoe pads 14 is shown in FIG. 1 for ease of description). Vehicle track 10 may, for example, define an endless track body or otherwise define a continuous track configured to be driven by one or more drive sprocket wheels (not shown). The drive sprocket wheel may be, for example, a part of a drive system of a vehicle. The drive system may also include one or more other drive sprocket wheels, such as a drive sprocket wheel that is positioned on an opposite end of vehicle track 10 from a first drive sprocket wheel. The drive sprocket wheel, which is typically actuated by a drive motor, engages with vehicle track 10 and rotates vehicle track 10. As vehicle track 10 rotates and engages with a ground surface, a vehicle on which vehicle track 10 is mounted moves either forward or backward, depending on the direction in which vehicle track 10 rotates. In other examples, other drive mechanisms may be used to drive vehicle track 10. Vehicle track 10 may be used with an industrial vehicle, such as, but not limited to, an earthmoving vehicle (e.g., a skid steer loader) or an agricultural vehicle (e.g., a tractor).

In FIG. 1, a part of vehicle track 10 has been cut away to illustrate interior side 13A and exterior side 13B of grousers 12. Exterior side 13B of grousers 12 is on an opposite side of grousers 12 from interior side 13A. Interior side 13A defines an inner circumference of vehicle track 10 and is configured to mount vehicle track 10 to a drive system of a vehicle. In the example shown in FIG. 1, interior side 13A includes two rows of guide lugs 18A and 18B (collectively, "guide lugs 18") that help align and engage a drive sprocket wheel with vehicle track 10. In particular, guide lugs 18 define guide channel 20 that is sized and shaped to receive a drive sprocket wheel. Guide lugs 18 of each row are longitudinally (or circumferentially in the case of a continuous vehicle track) aligned with a corresponding guide lug 18 in the opposing row (e.g., one guide lug 18A is aligned with an opposing guide lug 18B). However, in other examples, guide lugs 18 may be arranged to partially longitudinally overlap with a corresponding guide lug 18 in the opposing row or to alternate with guide lugs 18 of the opposing row such that no two guide lugs 18 have the same longitudinal position along interior side 13A of grousers 12. Moreover, in some cases, interior side 13A of grousers 12 may include guide lugs 18 that are near the edges of grousers 12, rather than substantially centered, as shown in FIG. 1.

Interior side 13A of grousers 12 also defines a plurality of ribs 16 that are configured to engage with drive sprocket teeth of a drive sprocket wheel when vehicle track 10 is mounted on the drive sprocket wheel. As the drive sprocket wheel rotates, the drive sprocket teeth engage with apertures defined between ribs 16, which rotates vehicle track 10. As a result of the rotation of vehicle track 10, vehicle track 10 (and any vehicle on which vehicle track 10 is mounted) moves in a first direction (e.g., forward). If the drive sprocket wheel is rotated in an opposite direction, vehicle track 10 moves in a second direction opposite to the first direction (e.g., backward).

Exterior side 13B of the plurality of grousers 12 defines an outer circumference of vehicle track 10 (or perimeter in the case of a non-circular vehicle track 10) or the plurality of grousers 12 and may be configured to engage with an exterior surface (e.g., the ground) when vehicle track 10 is mounted on a vehicle, and thus, exterior side 13B may be referred to as a ground contact surface of vehicle track 10 and/or plurality of grousers 12. In some examples, to help grousers 12 engage with the exterior surface and increase traction with a ground surface, exterior side 13B comprises a plurality of traction lugs 22. The plurality of traction lugs 22 may extend from a common surface of the plurality of grousers 12 to define the ground contact surface.

The plurality of grousers 12 may be made from any suitable material. In some examples, the plurality of grousers 12 is made from a metal or alloy. For example, grousers 12 may each include at least one of steel, such as, for example, low carbon steel (e.g., up to about 0.3 weight % carbon, such as, for example, C1022 steel) or medium carbon steel (e.g., up to about 0.5 weight % carbon, such as, for example, C1045 steel). The grousers 12 may be interconnected to form vehicle track 10 by chain links or any suitable connection mechanism. In some examples, such as the example illustrated in FIG. 1, the connection mechanism (e.g., chain links) may define guide lugs 18, ribs 16, and/or guide channel 20. The connection mechanism enables each grouser of the plurality of grousers 12 to move (e.g., pivot) relative to an adjacent grouser. For example, a grouser of the plurality of grousers 12 may pivot relative to an adjacent grouser to change the angle between adjacent grousers, which may enable vehicle track 10 to be flexible and maintain an elliptical shape (e.g., in the case of a continuous vehicle track 10). In other examples, the plurality of grousers 12 may be interconnected using an additional or an alternative connection mechanism, and/or guide lugs 18, ribs 16, and/or guide channel 20 may be defined by an additional or an alternative structure of grousers 12.

In some examples, a vehicle track (e.g., a vehicle track including plurality of grousers 12 and not including any shoe pads) may provide a vehicle mounted to the vehicle track with a relatively rough ride or may inadvertently damage a ground surface, such as, for example, grass. For example, in some cases in which vehicle track 10 is formed from a plurality of grousers 12 made from metal, the plurality of grousers 12 may be harder than some ground surfaces, which may result in the plurality of grousers 12 unintentionally causing changes to the ground surface. Moreover, plurality of grousers 12 made of metal may not absorb impact of the ground surface and/or flex upon contact with the ground surface, which may result in unintentional damage of the ground surface, a relatively rough ride, or both. In addition, in some examples, traction lugs 22 may define a non-continuous ground contact surface. For example, traction lugs 22 may be distributed along an exterior side of vehicle track 10, which may disrupt the ground contact surface of vehicle track 10. Due to this discontinuous ground contact surface, the ride of a vehicle mounted on vehicle track 10 may be relatively rough (e.g., bumpy) due to the transition between traction lugs 22 and the portions of the plurality of grousers 12 between traction lugs 22 contacting the ground surface as vehicle track 10 rotates. Thus, in some cases, a plurality of shoe pads 14 may be attached to the plurality of grousers 12 to cover at least a portion of exterior side 13B (e.g., ground contact surface of traction lugs 22) to provide the vehicle mounted to vehicle track 10 with a smoother ride and/or help prevent damage a ground surface. In some examples, each grouser of the plurality of grousers 12 may be covered by a respective shoe pad of the plurality of shoe pads 14.

The plurality of shoe pads 14 may be formed from a material that is softer than grousers 12. For example, the plurality of shoe pads 14 of vehicle track 10 may include (e.g., is formed from or otherwise includes) a polymer. In some examples, the plurality of shoe pads 14 may include one or both of polyurethane or an elastomer, such as a natural rubber, a synthetic rubber, or another elastomeric material. Examples of suitable synthetic rubbers include, but are not limited to, styrene butadiene rubber and polybutadiene rubber. In some examples, the plurality of shoe pads 14 may also include other agents and activators to help achieve desired material properties, such as reinforcing agents, vulcanization accelerators, antiozonants, antioxidants, vulcanizing agents, retarders, rubber softeners, tackifiers, or the like. The exact composition of the plurality of shoe pads 14 may depend upon various factors, including the particular application vehicle track 10 is intended to be used with. In some examples, the plurality of shoe pads 14 may have a hardness in a range of about 53 to about 87 on the type A Shore durometer scale (e.g., ASTM D2240 type A scale). For example, the plurality of shoe pads 14 may have a hardness in a range of about 79 to about 87 on the type A Shore durometer scale. In other examples, however, the plurality of shoe pads 14 may be formed from elastomeric or other materials having other hardnesses. In some examples, the plurality of shoe pads 14 may also have relatively high elongation and tensile strengths. Vehicle track 10 including the plurality of shoe pads 14 attached to the plurality of grousers 12 may help provide better maneuverability of a vehicle, better ride quality, and/or increased traction as compared to a vehicle track including grousers 12 alone.

Figure 2A:
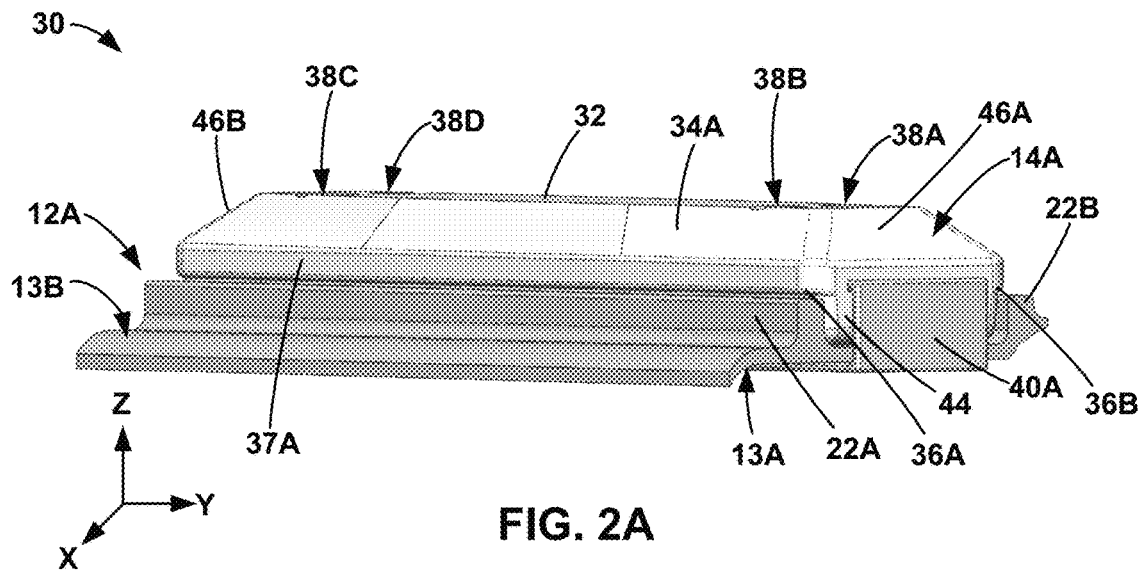
FIG. 2A is a perspective view of an example assembly including a shoe pad attached to a grouser of the vehicle track of FIG. 1.
Figure 2B:
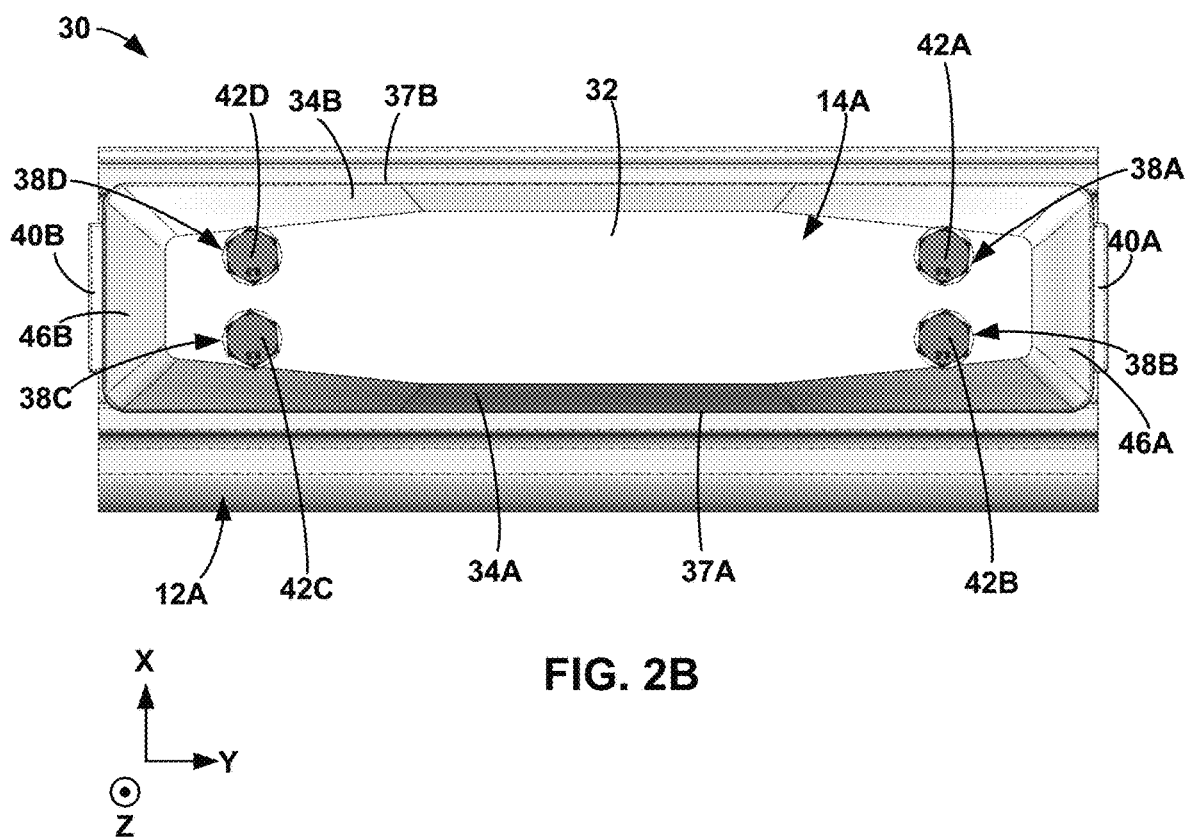
FIG. 2B is a top-down view of the example assembly of FIG. 2A.

FIG. 2A is a perspective view of an example assembly 30 including a shoe pad 14A attached to a grouser 12A of vehicle track 10 of FIG. 1. FIG. 2B is a top-down view of the example assembly 30. Assembly 30 may be a portion of vehicle track 10 of FIG. 1. For example, grouser 12A may be an example of one of the grousers of plurality of grousers 12 and shoe pad 14A may be an example of one of the shoe pads of plurality of shoe pads 14. In some examples, each grouser of the plurality of grousers may be configured like grouser 12A, and each shoe pad of the plurality of shoe pads 14 may be configured like shoe pad 14A. Thus, the description of the following figures describes a particular grouser 12A and a particular shoe pad 14A, but it should be understood that this description may apply to the other grousers of the plurality of grousers 12 and/or other shoe pads of the plurality of shoe pads 14 of vehicle track 10.

In the example of FIGS. 2A and 2B, a single shoe pad 14A is covering a single grouser 12A. In some such examples, shoe pad 14A may impede movement of the vehicle track less than other ratios of shoe pads 14A to grousers 12A (e.g., vehicle track 10 including the 1:1 ratio of shoe pads to grousers may be able to move in the same or substantially the same manner as a vehicle track including grousers 12A without shoe pads 14A). In other examples, however, more than one shoe pad 14A may be configured to cover a single grouser 12A or a single shoe pad 14A may be configured to cover more than one grouser 12A.

As seen in FIG. 2A, grouser 12A defines traction lugs 22A and 22B (collectively, "traction lugs 22"). In some examples, a portion of shoe pad 14A is configured to be positioned between traction lugs 22 and/or cover traction lugs 22 when shoe pad 14A is attached to grouser 12A. In this way, shoe pad 14A, rather than traction lugs 22, defines a ground contact surface of assembly 30, which may provide a vehicle mounted on vehicle track 10 including assembly 30 with a smoother ride and/or help prevent the vehicle track from damaging the ground surface compared to a vehicle track that does not include shoe pad 14A covering grouser 12A. In the example of FIGS. 2A and 2B, a bottom portion 44 of shoe pad 14A is between traction lugs 22A and 22B. In some examples, shoe pad 14A may form a relatively tight interference fit between traction lugs 22A and 22B. Thus, in some cases, a shape of shoe pad 14A (or a shape of a portion of shoe pad 14A such as bottom portion 44) may be configured to correspond to a shape of exterior surface 13B of grouser 12A. In this way, shoe pad 14A may not be able to slide or otherwise move between traction lugs 22, which may help shoe pad 14A remain relatively tightly secured to grouser 12A.

In some cases, shoe pad 14A includes one or more ledges 36A, 36B configured to cover one or more traction lugs 22. For example, ledge 36A is configured to cover an exterior side of traction lug 22A and ledge 36B is configured to cover an exterior side of traction lug 22B. Ledges 36A, 36B may help prevent exterior surfaces of traction lugs 22 from contacting the ground surface. In some cases, upon rotation of vehicle track 10 including assembly 30 with shoe pad 14A including one or more ledges 36A, 36B covering traction lugs 22, traction lugs 22 may be less likely to become exposed and/or contact the ground surface.

In other examples, shoe pad 14A may not include one or more ledges 36A, 36B configured to cover traction lugs 22. However, shoe pad 14A may still be configured to define the primary ground contact surface for vehicle track 10. For example, shoe pad 14A may be taller (e.g., as measured along the z-axis illustrated in FIG. 2A from exterior side 13B of grouser 12A to a top surface 32 of shoe pad 14A) when attached to grouser 12A than traction lug 22 (orthogonal x-y-z axes are shown in FIGS. 2A-4B for ease of description only). In other words, shoe pad 14A may define a first height (e.g., as measured along the z-axis) and grouser 12A (e.g., exterior side 13B of grouser 12A including traction lugs 22) may define a second height (e.g., measured along the z-axis from exterior side 13B to a ground contact surface of traction lugs 22) that is less than the first height. Therefore, traction lugs 22 may not extend as far as shoe pad 14A such that shoe pad 14A is able to contact the ground surface before or instead of track lugs 22 as vehicle track 10 rotates on the ground surface.

In some examples, shoe pad 14A may include a relatively planar top surface 32, tapered side surfaces 34A, 34B, and/or tapered edges 46A, 46B. Shoe pad 14A including a relatively planar top surface 32 may provide a relatively stable ground contact surface of shoe pad 14A. For example, a larger planar top surface 32 may provide a smoother ride for a vehicle in comparison to a smaller planar top surface and/or a non-planar top surface, as a larger planar top surface 32 may provide a larger ground contact surface for a vehicle mounted on vehicle track 10 including shoe pad 14A and grouser 12A. In other examples, top surface 32 may be curved (e.g., relative to the x-y-plane, rather than planar in the x-y plane). In some such examples, the curved top surface 32 may be relatively gradually curved, which may form a larger ground contact surface and/or increase the stability of vehicle track 10 in comparison to an abruptly curved top surface.

Tapered side surfaces 34A, 34B provide a gradual angular transition between side surfaces 37A, 37B, respectively, and top surface 32, which may help shoe pad 14A provide a smoother ride to a vehicle including assembly 30. For example, upon rotation of vehicle track 10 including shoe pad 14A, tapered side surfaces 34A, 34B may enable shoe pad 14A to smoothly move along the ground surface rather than abruptly contacting different surfaces of shoe pad 14A, such as top surface 32 and side surfaces 37A, 37B. For example, a first tapered side 34A may first contact the ground surface upon rotation of vehicle track 10, and first tapered side surface 34A may gradually contact the ground surface as vehicle track 10 rotates in comparison to a stepped or abrupt surface between top surface 32 and side surface 37A. Similarly, second tapered side surface 34B may enable a smooth transition from side surface 37B to planar top surface 32.

Tapered edges 46A, 46B may reduce stress on vehicle track 10 and/or shoe pad 14A. In some such examples, tapered edges 46A, 46B may reduce corner stress on shoe pad 14A and/or vehicle track 10 when vehicle track 10 is turning. For example, shoe pad 14A may gradually contact tapered edge 46A, 46B upon vehicle track 10 turning, rather than shoe pad 14A bending or otherwise deforming due to vehicle track 10 turning. In other examples, tapered edges 46A, 46B may reduce stress on vehicle track 10 and/or shoe pad 14A in other ways. Additionally, or alternatively, shoe pad 14A including tapered edges 46A, 46B may less likely to damage a ground surface vehicle track 10 is moving on.

In other examples, shoe pad 14A may not include substantially planar top surface 32, tapered side surfaces 34A, 34B, and/or tapered edges 46A, 46B. For example, one or more portions of shoe pad 14A may be designed based on an application of vehicle track 10, performance characteristics desired of vehicle track 10, a type of vehicle that the vehicle track is mounted on, or the like. Thus, shoe pad 14A may define any shape suitable to fit particular needs. Moreover, in some examples, shoe pad 14A, or a plurality of shoe pads 14, may define a tread pattern. For example, shoe pad 14A may include one or more traction lugs protruding from top surface 32. In some such examples, the tread pattern may help shoe pad 14A or the plurality of shoe pads 14 adequately grip a ground surface.

In the example of FIGS. 2A and 2B, shoe pad 14A is attached to grouser 12A using one or more brackets 40A, 40B. Although two brackets 40A, 40B are shown in the figures, in other examples, shoe pad 14A can be attached to grouser using only one bracket 40A or 40B or more than two brackets (e.g., multiple brackets on opposite ends of shoe pad 14A). If multiple brackets are used on the same end of shoe pad 14A, each bracket may be configured to be received in different parts of the same slot defined by shoe pad 14A or in respective, separate slots defined by shoe pad 14A. In some cases, one or more bolts 42A-42D configured to fit within respective bolt apertures 38A-38D of shoe pad 14A can also be used to secure shoe pad 14A relative to grouser 12A. Details of one or more example brackets 40A, 40B, one or more example bolts 42A-42D, one or more example bolt apertures 38A-38D, and an example of the attachment of shoe pad 14A to grouser 12A will be described with respect to FIGS. 3-4B.

Figure 3:
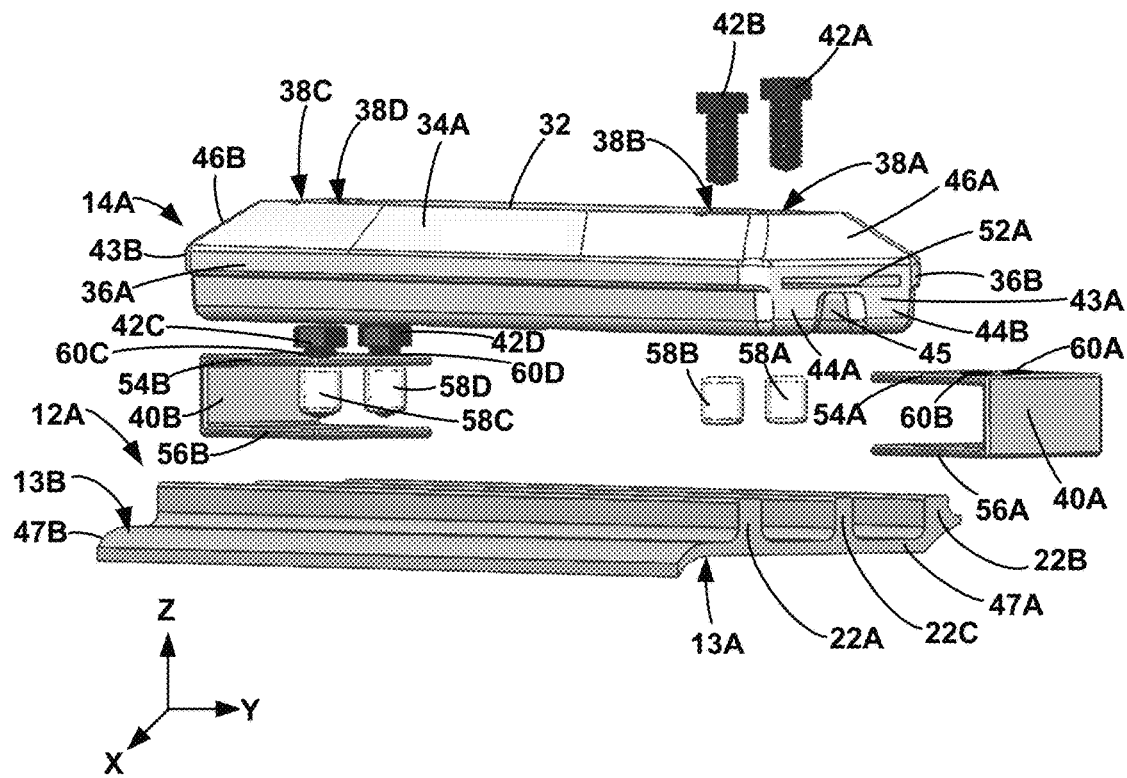
FIG. 3 is an exploded perspective view of part of the assembly of FIGS. 2A and 2B.

FIG. 3 is an example exploded view of part of the assembly 30 of FIGS. 2A and 2B. Shoe pad 14A defines first edge 43A and second edge 43B opposite first edge 43A. In some examples, first edge 43A may align or substantially align with a first grouser edge 47A and second edge 43A may align or substantially align with a second grouser edge 47B when shoe pad 14A is attached to grouser 12A. In this way, a width of shoe pad 14A extending from first edge 43A to second edge 43B may be the same or substantially the same as a width of grouser 12A extending from first grouser edge 47A to second grouser edge 47B, the widths being measured along the y-axis. In turn, shoe pad 14A may define a ground contact surface such that grouser 12A does not contact the ground surface upon movement of vehicle track 10.

In some situations, shoe pad 14A that is approximately the same width as grouser 12A may be more stable that a shoe pad that is less wide or wider than grouser 12A. For example, a shoe pad that is narrower (i.e., less wide) than grouser 12A may result in a vehicle track that defines an uneven ground contact surface, which may be relatively unstable. Additionally, or alternatively, the portions of grouser 12A not covered by the shoe pad may be able to contact the ground surface, which may disrupt the continuity of the vehicle track 10 ground contact surface and adversely affect the stability of vehicle track 10. As another example, a shoe pad that is wider than grouser 12A may be able to bend around grouser 12A (e.g., the portions of the shoe pad extending past the width of grouser 12A), which may cause the vehicle including grouser 12A to be unstable as it moves along a ground surface. For example, the portions that may bend around grouser may be unsupported by the grouser or another structure of vehicle track 10, which may decrease the stability of a vehicle to which vehicle track 10 is mounted.

Figure 4A:
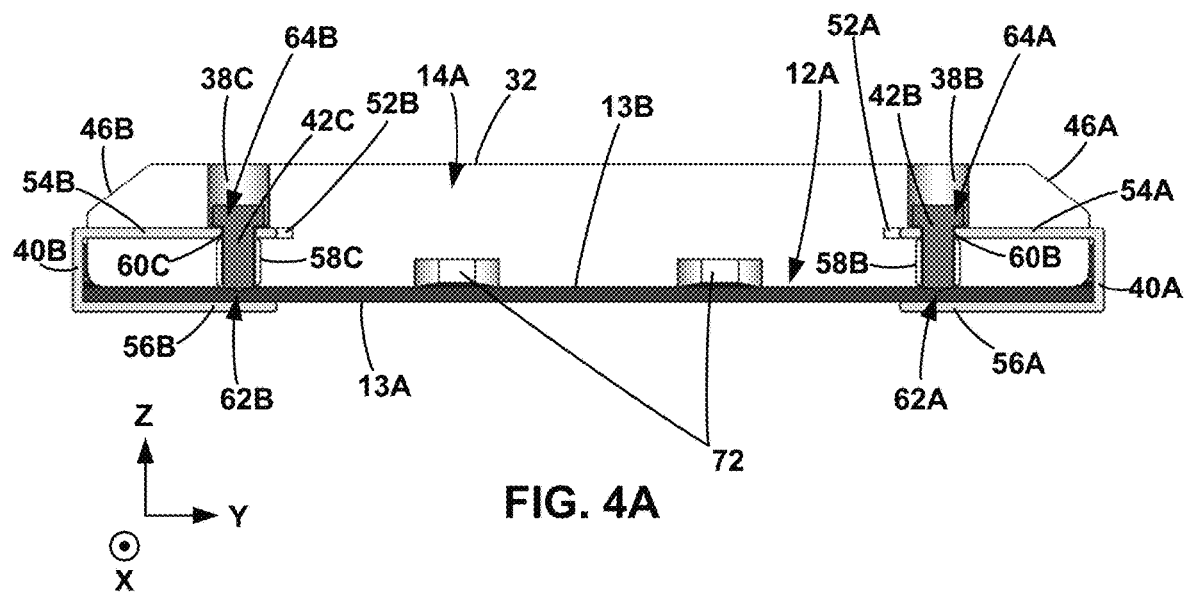
FIG. 4A is a schematic cross-sectional view illustrating the example assembly of FIGS. 2A-3, where the cross-section is taken along a width of the assembly and illustrates a shoe pad attached to a grouser.
Figure 4B:
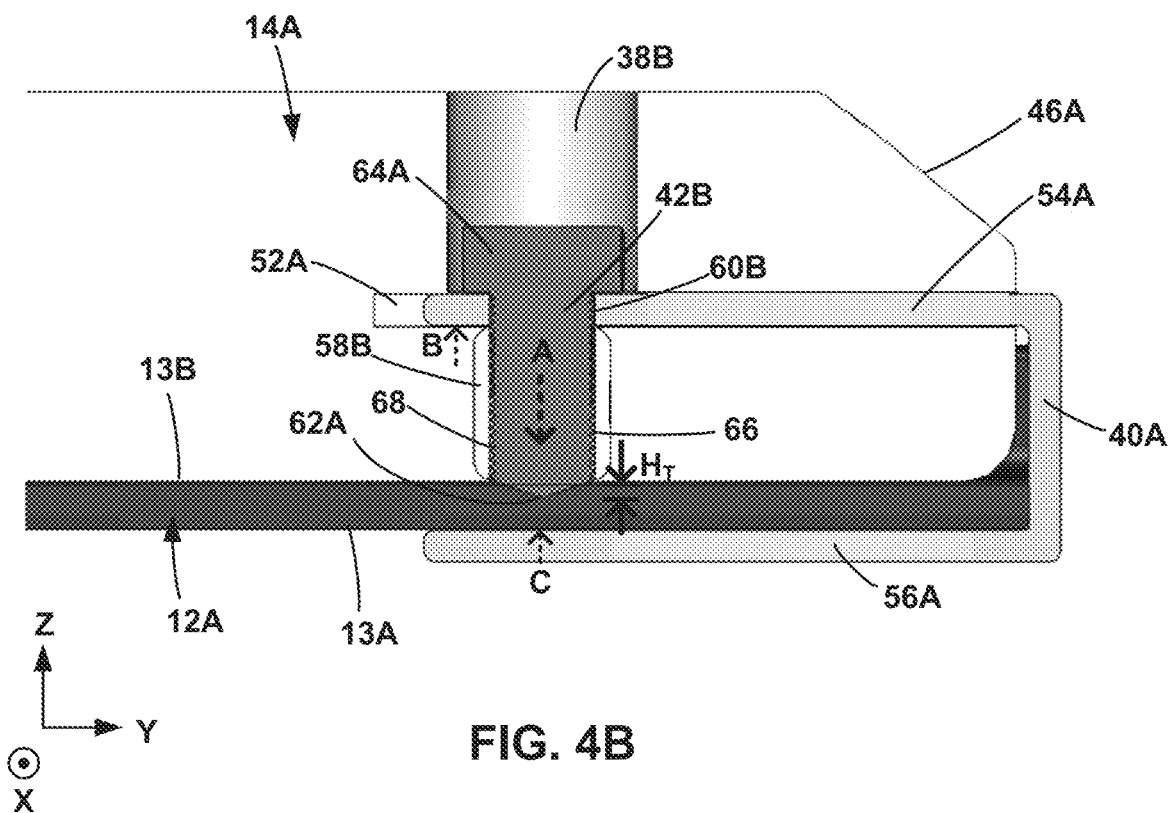
FIG. 4B is an enlarged cross-sectional view of part of the example assembly of FIG. 4A.

In the example shown in FIGS. 3-4B, shoe pad 14A is attached to grouser 12A using two brackets 40A, 40B positioned at opposite edges 43A, 43B, respectively of grouser 12A. In order for bracket 40A to engage with shoe pad 14A, shoe pad 14A defines a first slot 52A on first edge 43A, slot 52A being configured to receive first arm 54A of bracket 40A. First slot 52A may have any suitable width (e.g., as measured from first edge 43A along the y-axis) to receive first arm 54A of first bracket 40A. In some examples, first slot 52A may be wide enough such that first bracket 40A abuts first edge 43A of shoe pad 14A when fully inserted in first slot 52A. In some examples, the width of first slot 52A may be about 40 mm to about 130 mm, such as about 49.2 mm to about 95.8 mm or about 45 mm to about 130 mm. In other examples, first slot 52A may have a different width. For example, in some cases, first slot 52A may extend through the entire width of shoe pad 14A. In this way, first slot 52A and a second slot 52B (shown in FIG. 4A) may be a single, contiguous slot defining slotted apertures configured to receive first bracket 40A and second bracket 40B, respectively, on opposite ends of shoe pad 14A.

Similar to the width of first slot 52A, first slot 52A may define any suitable length (e.g., as measured along the x-axis) to receive first arm 54A of first bracket 40A. In some cases, the x-axis direction is in a substantially longitudinal (or circumferential) direction of vehicle track 10 including shoe pad 14A and grouser 12A. In some examples, the length of first slot 52A is about 50 mm to about 150 mm, such as about 70 mm to about 120 mm or about 51 mm to about 105 mm. In some examples, the length of first slot 52A may be about 67% of the length of shoe pad 14A (e.g., from first side surface 37A to second side surface 37B along the x-axis). In other examples, first slot 52A may define a different length. In some cases, the length of first slot 52A may depend on a pitch of the connection mechanism of the plurality of grousers 12 (e.g., a distance between the centers of adjacent chain links configured to connect the plurality of grousers 12). A wider pitch may result in a wider slot length. For example, a vehicle track 10 with a chain link pitch of about 135 mm may include shoe pad 14A with first slot 52A having a length of about 94 mm, and a vehicle track 10 with a chain link pitch of about 171 mm may include shoe pad 14A with a first slot 52A having a length of about 109 mm.

In other examples, vehicle tracks with chain link pitches of 135 mm or 171 mm may include shoe pads including first slots with other lengths.

First slot 52A may have any suitable position along shoe pad 14A. In some cases, first slot 52A may be centered along a length of first edge 43A of shoe pad 14A, which may enable first bracket 40A to be centered along the length of shoe pad 14A and help apply an evenly distributed securement force to secure shoe pad 14A to grouser 12A. Moreover, in some examples, the length of first slot 52A may extend across a majority of the length of shoe pad 14A (e.g., 51% to about 90% of the length of shoe pad 14A). In some such examples, shoe pad 14A may be attached to grouser 12A more securely than in examples in which the length of first slot 52A is less than a majority of the length of shoe pad 14A. For example, shoe pad 14A may be attached to grouser 12A more securely due to first bracket 40A inserted within first slot 52A engaging with a larger portion of shoe pad 14A. In this way, shoe pad 14A may be less likely to detach from or otherwise move relative to grouser 12A over time.

Shoe pad 14A defines an exterior side that is configured to engage with a ground contact surface, and an interior side that is configured to engage with grouser 12A. In some examples, top surface 32 and/or tapered side surfaces 34A, 34B define the exterior side of shoe pad 14A, and bottom portions 44A, 44B and/or channel 45 define the interior side of shoe pad 14A. First slot 52A may be any suitable distance from the exterior side (e.g., as measured from the exterior side of shoe pad 14A along the z-axis direction illustrated in FIG. 3). In some examples, first slot 52A may be approximately centered (e.g., centered or nearly centered to the extent permitted by manufacturing tolerances, such as within 1 or 2 centimeters of being centered) between the exterior surface and the interior surface of shoe pad 14A. In other examples, first slot 52A may be about 10 mm to about 50 mm from the exterior surface (e.g., measured along the z-axis), such as about 21 mm to about 29 mm from the exterior surface (e.g., along the z-axis) or about 26 mm to about 29 mm from the exterior surface. In either example, first slot 52A is positioned relative to the exterior surface of shoe pad 14A to provide a sufficient contact area between first bracket 40A and shoe pad 14A to facilitate a fit between first bracket 40A and shoe pad 14A that results in a stable positioning of bracket 40A relative to shoe pad 14A. A stable bracket 40A position enables bracket 40A to stay in place relative to shoe pad 14A during use of vehicle track 10. Similar to the width and length of first slot 52A, the distance from the exterior side of shoe pad 14A may depend on the configuration of first bracket 40A.

In some examples, an opening to first slot 52A additionally or alternatively may be positioned on first edge 43A of shoe pad 14A below first tapered edge 46A, which may increase the surface area of first edge 43A of shoe pad 14A that bracket 40A interfaces with when first arm 54A of bracket 40A is fully inserted into slot 52A. Increasing the surface area of shoe pad 14A that bracket 40A interfaces with when bracket 40A is inserted into slot 52A may help increase the stability of bracket 40A relative to shoe pad 14A.

Shoe pad 14A is configured to be attached to grouser 12A as described with respect to FIGS. 2A and 2B. For example, the interior side of shoe pad 14A is configured to contact exterior side 13B of grouser 12A such that the exterior side of shoe pad 14A is configured to contact a ground surface when shoe pad 14A is attached to grouser 12A. As discussed above, in some examples, grouser 12A may include traction lugs. For example, in some examples, as shown in FIG. 3, grouser 12A includes three tractions lugs 22A-22C on exterior side 13B. In other examples, grouser 12A may include any number of traction lugs, such as, for example, one traction lug, two traction lugs, or four or more traction lugs. Shoe pad 14A may be configured to cover the traction lugs, e.g., traction lugs 22A-22C, of grouser 12A, such the covered traction lugs do not contact a ground surface when shoe pad 14A is attached to grouser 12A. In the example of FIG. 3, ledges 36A and 36B are configured to cover traction lugs 22A and 22B (as seen in FIGS. 2A and 2B) and a channel 45 is configured to cover traction lug 22C.

In some examples, such as described with respect to FIGS. 2A and 2B, bottom portion 44 of shoe pad 14A is configured to form an interference fit with traction lugs 22A and 22B. As seen in FIG. 3, shoe pad 14A is also configured to form an interference fit with traction lug 22C. In other examples, shoe pad 14A may be configured to form an interference fit with any number of traction lugs. Moreover, in some cases, shoe pad 14A is configured such that it does not form an interference fit with all or any of the traction lugs. Instead, shoe pad 14A may be configured to fit between traction lugs or otherwise fit around the traction lugs. In the example of FIG. 3, bottom portion 44 of shoe pad 14A includes a first bottom portion 44A configured to fit between traction lugs 22A and 22C, a second bottom portion 44B configured to fit between traction lugs 22B and 22C, e.g., to form interference fits with traction lugs 22A-22C. Bottom portion 44 also defines channel 45 configured to receive traction lug 22C when shoe pad 14A is attached to grouser 12A. In some examples, the shape of at least one of first bottom portion 44A, second bottom portion 44B, or channel 45 corresponds to the shape of exterior side 13B of grouser 12A to enable shoe pad 14A to mate with exterior side 13B of grouser 12A. For example, the shape of channel 45 may correspond to the shape of traction lug 22C. In turn, shoe pad 14A may be more likely to remain in an intended position on grouser 12A, remain securely attached to grouser 12A, be easier to install on grouser 12A, or any combination thereof.

In some examples, shoe pad 14A is secured to grouser 12A using first bracket 40A. First bracket 40A includes a first arm 54A and a second arm 56A. First arm 54A is configured to be inserted into first slot 52A of shoe pad 14A. In the example of FIG. 3, first arm 54A defines bolt apertures 60A and 60B. In other examples, first arm 54A may define a single bolt aperture 60A or 60B, or first arm 54A may define more than two bolt apertures 60A, 60B. Bolt apertures 60A, 60B defined by first arm 54A may substantially align with bolt apertures 38A, 38B defined by shoe pad 14A when first arm 54A is fully inserted into first slot 52A, e.g., such that the portion of shoe pad 14A between arms 54A, 56A contacts first edge 43A of shoe pad 14A. In some examples, first arm 54A may include at least the number of bolt apertures 60A, 60B as the number of bolt apertures 38A, 38B in communication with slot 52A defined by shoe pad 14A. For example, first arm 54A may include two bolt apertures 60A, 60B or more than two bolt apertures 60A, 60B. In turn, bolts 42A, 42B or another connection mechanism may be inserted through bolt apertures 38A, 38B of shoe pad 14A and corresponding bolt apertures 60A, 60B of first arm 54A of first bracket 40A to secure shoe pad 14A to grouser 12A.

Second arm 56A of first bracket 40A is configured to contact interior side 13A of grouser 12A when first arm 54A is inserted in slot 52A. Thus, first bracket 40A wraps around grouser 12A from exterior side 13B (e.g., through first slot 52A of shoe pad 14A) to interior side 13A to attach shoe pad 14A to grouser 12A without requiring grouser 12A itself to include any apertures (e.g., for bolts 42A-42D to be inserted through). At least partially due to the manner in which first bracket 40A wraps around grouser 12A and holds grouser 12A and shoe pad 14A together, first bracket 40A may enable shoe pad 14A to remain tightly secured to grouser 12A over time and during use of vehicle track 10, which may enable shoe pad 14A to have a longer useful life than some other type of shoe pads (e.g., bolt-on and/or clip-on shoe pads). Additionally, or alternatively, because first bracket 40A is not permanently attached to shoe pad 14A and/or grouser 12A, shoe pad 14A may be easily replaced by another shoe pad.

A width (e.g., as measured along the y-axis direction, which extends from first edge 43A to second edge 43B), a length (e.g., as measured along the x-axis direction), and a height (e.g., as measured from first arm 54A to second arm 56A in the direction of the z-axis) of first bracket 40A may depend on a configuration of shoe pad 14A, such as a size or location of first slot 52A, a configuration of grouser 12A, an intended use of vehicle track 10, or the like. Therefore, first bracket 40A may be any suitable shape, size, or configuration to fit particular needs.

First bracket 40A may include any suitable material. In some examples, first bracket 40A includes a metal or alloy. For example, first bracket 40A may include at least one of steel, low carbon steel, medium carbon steel, or the like. In some examples, first bracket 40A may be made from the same metal or alloy as grouser 12A.

In some examples, one or more bolts 42A-42D may be used to help hold brackets 40A, 40B in place relative to shoe pad 14A and grouser 12A. For example, shoe pad 14A may define one of more bolt apertures 38A-38D configured to receive respective bolts 42A-42D. Bolt apertures 38A-38D may be in communication with slots 52A, 52B such that when brackets 40A, 40B are fully inserted into the respective slot 52A, 52B, bolts 42A-42D inserted in bolt apertures 38A-38D engage with first arms 54A, 54B of brackets 40A, 40B, respectively, which may compress first and second arms 54A, 54B, 56A, 56B of each bracket 40A, 40B.

In the example of FIG. 3, shoe pad 14A defines two bolt apertures 38A, 38B in communication with first slot 52A. In other examples, shoe pad 14A may define one bolt aperture or more than two bolt apertures in communications with first slot 52A. In some examples, bolt apertures 38A, 38B extend from the exterior side of shoe pad 14A to first slot 52A or past first slot 52A. For example, bolt apertures 38A, 38B may extend from top surface 32 to first slot 52A, or bolt apertures 38A, 38B may extend from top surface 32 past first slot 52A (e.g., closer to or into bottom portion 44 of shoe pad 14A). Bolt apertures 38A, 38B may enable bolts 42A, 42B or another attachment mechanism to be inserted through bolt apertures 38A, 38B defined by shoe pad 14A and bolt apertures 60A, 60B on first arm 54A of first bracket 40A to secure first bracket 40A in place relative shoe pad 14A and grouser 12A. Additional details with respect to bolts 42A-42D will be described with respect to FIGS. 4A and 4B.

Figure 4C:
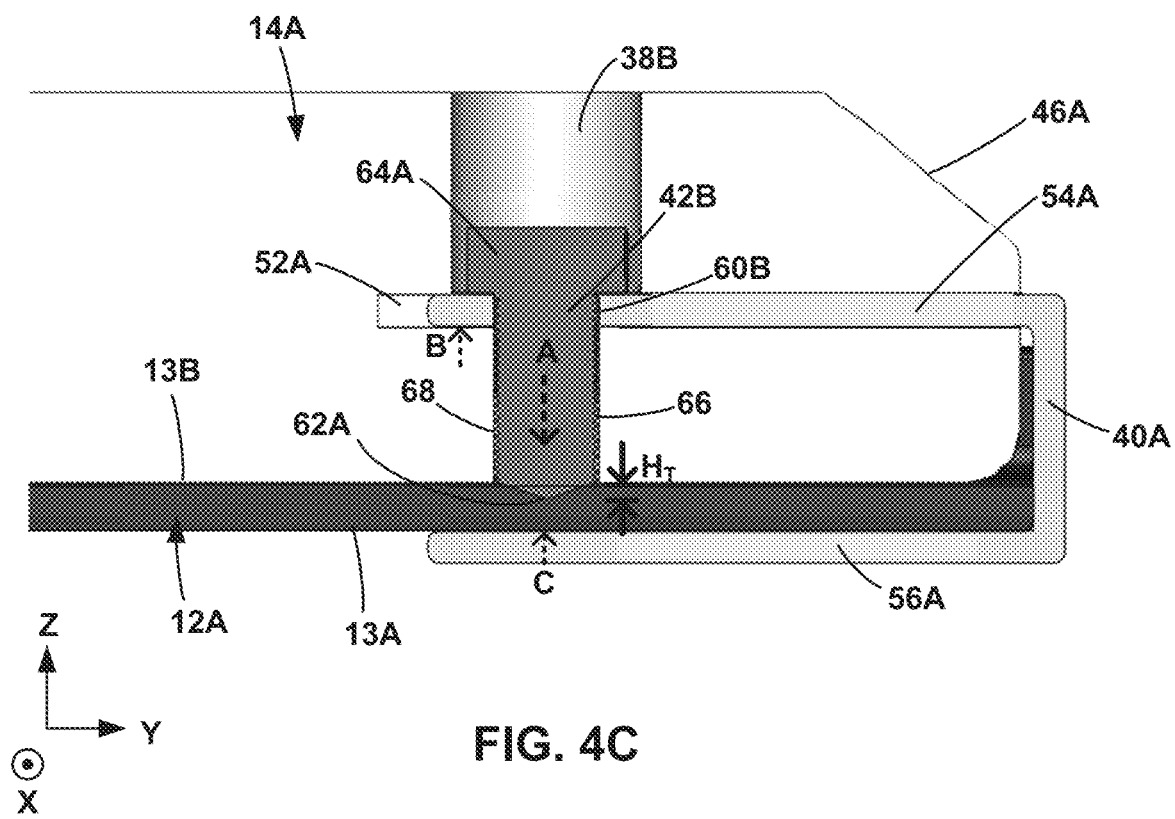
FIG. 4C is an enlarged cross-sectional view of part of another example of the assembly of FIG. 4A.

In examples in which first bracket 40A is secured to shoe pad 14A and grouser 12A using bolts 42A, 42B, the bolts 42A, 42B may include threaded bolts. In some such examples, shoe pad 14A may include threaded inserts 58A, 58B configured to engage with bolts 42A, 42B. For example, threaded inserts 58A, 58B may form threaded connections with the threaded bolts 42A, 42B, as shown in FIG. 4B. In other examples, however, shoe pad 14A itself may define threads configured to thread with bolts 42A, 42B, rather than including separate threaded inserts 58A, 58B, as shown in FIG. 4C. Additional details with respect to threaded inserts 58A-58D will be described with respect to FIGS. 4A and 4B.

Although FIG. 3 is mainly described with respect to first slot 52A, first bracket 40A, first edge 43A, first bolt apertures 38A, 38B, second bolt apertures 60A, 60B, bolts 42A, 42B, and threaded inserts 58A, 58B (e.g., one half of assembly 30 of shoe pad 14A and grouser 12A), an assembly including shoe pad 14A and grouser 12A may include a second half that is substantially similar to the first half. For example, shoe pad 14A may define a second slot 52B and first bolt apertures 38C, 38D, and assembly 30 may include a second bracket 40B defining second bolt apertures 60C, 60D, bolts 42C, 42D, and threaded inserts 58C, 58D, which may be the same or substantially the same as described with respect to first slot 52A, first bolt apertures 38A, 38B, second bolt apertures 60A, 60B, first bracket 40A, bolts 42A, 42B, and threaded inserts 58A, 58B, respectively. In some examples, an assembly including both first slot 52A, first bracket 40A, first edge 43A, first bolt apertures 38A, 38B, second bolt apertures 60A, 60B, bolts 42A, 42B, and threaded inserts 58A, 58B and second slot 52A, second bracket 40B, first bolt apertures 38C, 38D, second bolt apertures 60C, 60D bolts 42C, 42D, and threaded inserts 58C, 58D may enable shoe pad 14A to be more securely attached to grouser 12A in comparison to an assembly only including first slot 52A, first bracket 40A, first edge 43A, first bolt apertures 38A, 38B, second bolt apertures 60A, 60B, bolts 42A, 42B, and threaded inserts 58A, 58B or second slot 52B, second bracket 40B, first bolt apertures 38C, 38D, second bolt apertures 60C, 60D, bolts 42C, 42D, and threaded inserts 58C, 58D. For example, two, opposite edges 43A, 43B of shoe pad 14A both being attached to grouser 12A by a respective bracket 40A, 40B may be more likely to remain in an intended position on grouser 12A in comparison to an assembly 30 only including one edge 43A or 43B being attached to grouser 12A with bracket 40A or 40B. In any case, the assembly may include some or all of first slot 52A, second slot 52B, first bracket 40A, second bracket 40B, first bolt apertures 38A-38D, second bolt apertures 60A-60D, bolts 42A-42D, and/or threaded inserts 58A-58D.

FIG. 4A is a schematic cross-sectional view illustrating the example assembly 30 of FIGS. 2A-3 of shoe pad 14A attached to grouser 12A, where the cross-section is taken along a width (e.g., along the y-axis) of assembly 30 and illustrates shoe pad 14A attached to grouser 12A. FIG. 4B is an enlarged cross-sectional view of part of the example assembly 30 of FIG. 4A. As seen in FIG. 4A, first arms 54A, 54B of first bracket 40A and second bracket 40B, respectively, are inserted into respective slots 52A, 52B of shoe pad 14A, and second arms 56A, 56B of first bracket 40A and second bracket 40B, respectively, are contacting interior side 13A of grouser 12A. In order to help hold first and second brackets 40A, 40B in place relative to shoe pad 14A and grouser 12A and/or secure shoe pad 14A to grouser 12A, bolts 42A-42D are inserted through respective first bolt apertures 38A-38D of shoe pad 14A and respective second bolt apertures 60A-60D of brackets 40A, 40B.

In some examples, bolts 42A-42D are configured to engage with exterior side 13B of grouser 12A when bolts 42A-42D are inserted through respective first bolt apertures 38A-38D of shoe pad 14A and respective second bolt apertures 60A-60D of brackets 40A, 40B. For example, in some cases, bolts 42A-42D may each include a tip portion, e.g., as shown in FIG. 4A as tip portions 62A, 62B of bolts 42C, 42B, respectively, that engages with exterior side 13B of grouser 12A when inserted through first bolt apertures 38A-38D and second bolt apertures 60A-60D. Bolts 42A-42D, however, do not extend through a thickness of grouser 12A or predefined bolt apertures in grouser 12A in the example shown in FIG. 4A. Instead, for example, tip portions of bolts 42A-42D, e.g., tip portions 62A, 62B, may "dig into" exterior side 13B of grouser 12A without extending therethrough. In this way, bolts 42A-42D may help secure brackets 40A, 40B in place relative to shoe pad 14A and grouser 12A without requiring bolt apertures in grouser 12A. The tip portions of bolts 42A-42D may be, for example, relatively sharp or blunt, but in either example, are configured to apply a force against exterior side of grouser 12A.

For example, bolts 42A-42D configured to engage with exterior side 13B may compress first arms 54A, 54B and second arms 56A, 56B of each bracket 40A, 40B toward each other, which may help prevent brackets 40A, 40B from becoming displaced, and may also help retain shoe pad 14A on grouser 12A. As seen in FIG. 4B, bolt 42B presses first arm 54A in the direction of arrow A, and first arm 54A may subsequently press against a head 64A of bolt 42B in the direction of arrow B. Such forces in the directions of arrows A and B, may result in second arm 56A of bracket 40A pressing against interior side 13A of grouser 12A in the direction of arrow C. In turn, first arm 54A and second arm 56A may be compressed toward each other, and shoe pad 14A may remain securely attached to grouser 12A for a longer period of time in comparison to some other shoe pads, such as clip-on shoe pads, without requiring grouser 12A to include apertures configured to receive bolts 42A-42D.

Bolts 42A-42D may include any suitable material. In some examples, bolts 42A-42D may include a metal or alloy, such as, for example, steel, a high-alloy steel, or the like. For example, in some cases, bolts 42A-42D may include grade 8 alloy steel (e.g., AISI 4140) or class 12.9 steel (e.g., ASTM F568M).

Bolts 42A-42D may also be any suitable size (e.g., diameter and height) to fit particular needs. In some examples, bolts 42A-42D may have a height of about 20 mm to about 50 mm, such as about 25 mm to about 39 mm (e.g., as measured from head 64A, 64B of bolt 42A-42D to tip portion 62A, 62B along the z-axis). In some examples, the height of bolts 42A-42D may be shorter than the height of shoe pad 14A. In this way, head 64A, 64B of bolts 42A-42D may be within shoe pad 14A (e.g., within first bolt apertures 38A-38D) and may not protrude from top surface 32 of shoe pad 14A when bolts 42A-42D are inserted through first bolt apertures 38A-38D and second bolt apertures 60A-60D. In turn, bolts 42A-42D may be less likely to become loose, contact a ground surface, become damaged, or the like. Moreover, first arms 54A, 54B and second arms 56A, 56B may be compressed toward each other depending on the height of bolts 42A-42D, which may help hold brackets 40A, 40B in place relative to shoe pad 14A and grouser 12A.

In some examples, bolts 42A-42D may include tip portion. Tip portions 62A, 62B of bolts 42B, 42C, respectively, are shown in FIG. 4A and tip portion 62A of bolt 42B is shown in FIG. 4B. The configurations of tip portions 62A, 62B are representative of the tip portions of bolts 42A-42D. Tip portions 62A, 62B are configured to engage with exterior side 13B of grouser 12A. Tip portions 62A, 62B may each have a height $H_T$ greater than 0 mm to about 5 mm, such as about 0.10 mm to about 3 mm, about 0.10 mm to about 1.5 mm, or about 1.3 mm to about 2.0 mm. In some examples, up to about 1.5 mm of tip portion 62A, 62B may be configured to dig into exterior side 13B. In the example of FIG. 4B, the entire height $H_T$ of tip portion 62A is engaged (e.g., digging into) exterior side 13B of metal grouser 12A. In other examples, a portion less than the entire height $H_T$ may engage with exterior side 13B. In yet other examples, none of the height $H_T$ of tip portion 62A is engaged (e.g., digging into) exterior side 13B of metal grouser 12A. In some examples, the amount of tip portion 62A that engages with exterior side 13B of grouser 12A may depend on the material from which grouser 12A is formed. In other examples, bolts 42A, 42B may not include a tip portion 62A, 62B (e.g., may have a relatively flat end). In some such examples, the flat end may be configured to engage (e.g., contact) exterior side 13B of metal grouser 12A. In any case, when tip portions 62A, 62B or the flat ends are engaged with exterior side 13B of grouser 12A, bolts 42A-42D may compress first arms 54A, 54B and second arms 56A, 56B toward each other, which may hold brackets 40A, 40B in place relative to shoe pad 14A and grouser 12A. Moreover, tip portions 62A, 62B or flat ends engaged with exterior side 13B may be less likely to translate across exterior side 13B (e.g., in the direction of the x- or y-axes), which may further help hold brackets 40A, 40B in place.

In some examples, bolts 42A-42D may include threaded bolts. In some such examples, assembly 30 may further include threaded inserts 58A-58D that may be configured to form a threaded connection with bolts 42A-42D. For example, one of bolts 42A-42D or threaded inserts 58A-58D may include female threads, and the other of bolts 42A-42D or threaded inserts 58A-58D may include male threads. As seen in FIG. 4B, bolt 42B includes male threads 66 and threaded insert 58B includes female threads 68 configured to form a threaded connection with the male threads 66. In some cases, a threaded connection between bolts 42A-42D and threaded inserts 58A-58D may help prevent bolts 42A-42D and/or brackets 40A, 40B from loosening over time, which may increase the useful life of shoe pad 14A attached to grouser 12A.

Threaded inserts 58A-58D may include any suitable material. For example, threaded inserts 58A-58D may include a metal or alloy. In some such examples, threaded inserts 58A-58D may include steel, grade 8 alloy steel, medium carbon steel, or the like. Examples of grade 8 alloy steel may include medium carbon steel (e.g., between about 0.31 weight % and about 0.60 weight % carbon) such as, for example, AISI 4140. In some examples, grade 8 alloy steel may have a tensile strength of greater than about 1034 megapascals (MPa) (about 150,000 pounds per square inch (psi)). In other examples, threaded inserts 58A-58D may include a different material.

In some examples, threaded inserts 58A-58D may be embedded in shoe pad 14A. For example, threaded inserts 58A-58D may be embedded in shoe pad 14A during manufacture of shoe pad 14A. In other examples, threaded inserts 58A-58D may positioned in or attached to shoe pad 14A in a different manner. As one example, shoe pad 14A may be formed with apertures corresponding to desired locations of threaded inserts 58A-58D, and threaded inserts 58A-58D may be inserted in the apertures and held in place, such as, for example, via a friction fit, an adhesive, or the like. In some other examples, shoe pad 14A itself may include threads configured to form a threaded connection with bolts 42A-42D in addition to, or as alternative to, including threaded inserts 58A-58D. In other cases, shoe pad 14A may include or define a mechanism other than threads configured to engage with bolts 42A-42D.

Threaded inserts 58A-58D may be in communication with slots 52A, 52B and first bolt apertures 38A-38D when positioned in shoe pad 14A. In this way, when bolts 42A-42D are inserted through first bolt apertures 38A-38D of shoe pad 14A and second bolt apertures 60A-60D of brackets 40A, 40B, bolts 42A-42D can be inserted into threaded inserts 58A-58D to form the threaded connection. In some examples, threaded inserts 58A-58D include an open end proximate exterior side 13B of grouser 12A such that bolts 42A-42D can extend through threaded inserts 58A-58D. For example, at least tip portion 62A, 62B of bolts 42A-42D may extend out of threaded inserts 58A-58D such that tip portions 62A, 62B can engage with exterior side 13B of grouser 12A. In this way, threaded inserts 58A-58D may be open on both ends to both receive bolts 42A-42D and enable bolts 42A-42D to engage with grouser 12A.

In some examples, shoe pad 14A may define additional apertures, such as, for example, connection bolt apertures 72 as shown in FIG. 4. Such connection bolt apertures 72 may be configured to receive a head of a bolt used to attach a connection mechanism (e.g., chain links) to grouser 12A. In some cases, shoe pad 14A including the additional apertures such as connection bolt apertures 72 may enable shoe pad 14A to be flush on exterior side 13B of grouser 12A rather than being spaced from exterior side 13B due to bolts or other components of vehicle track 10. In other examples, shoe pad 14A may define apertures in addition to, or as an alternative to, connection bolt apertures 72 configured to receive a head of a bolt used to attach a connection mechanism (e.g., chain links) to grouser 12A.

Figure 5:
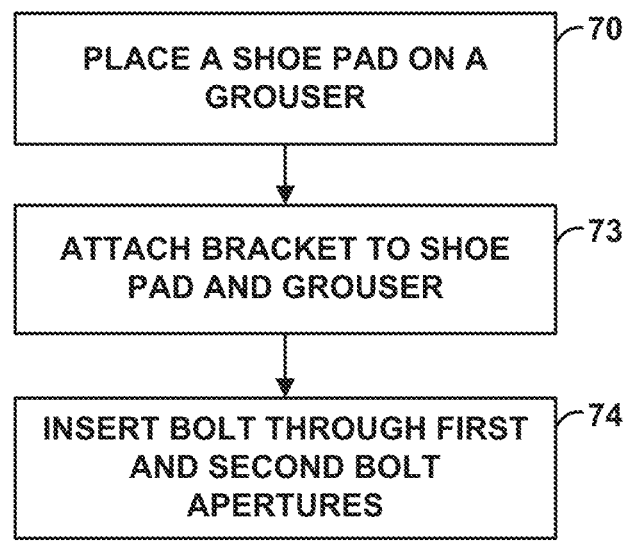
FIG. 5 is a flow diagram illustrating an example technique of attaching a shoe pad to a grouser.

FIG. 5 is a flow diagram illustrating an example technique of attaching a shoe pad to a grouser. The technique of FIG. 5 will be described with respect to assembly 30 of FIGS. 2A-4B. In other examples, however, the technique of FIG. 5 may be used to attach other shoe pads to other grousers using one or more brackets (e.g., other than shoe pad 14A and/or grouser 12A described with respect to FIGS. 2A-4B).

The technique of FIG. 5 includes placing shoe pad 14A on grouser 12A (70). For example, shoe pad 14A may be placed on exterior side 13B of grouser 12A. In some examples, bottom portion 44 of shoe pad 14A may be configured to form an interference fit between traction lugs 22A-22C of grouser 12A or may be configured to mate with traction lugs 22A-22C more loosely, e.g., without forming an interference fit. Shoe pad 14A placed on grouser 12A may define a ground contact surface of vehicle track 10 including shoe pad 14A and grouser 12A. Thus, in some examples, the technique of FIG. 5 may include placing a plurality of shoe pads 14 on a plurality of grousers 12 (e.g., a plurality of shoe pads 14 and a plurality of grouser 12 of vehicle track 10).

After shoe pad 14A is placed on grouser 12A, first bracket 40A may be attached to shoe pad 14A and grouser 12A (73). For example, first arm 54A of bracket 40A may be inserted into first slot 52A of shoe pad 14A and second arm 56A may contact interior side 13A of grouser 12A. Attaching first bracket 40A to shoe pad 14A and grouser 12A may include aligning first bolt apertures 38A, 38B of shoe pad 14A with second bolt apertures 60A, 60B of first arm 54A such that the first and second bolt apertures 38A, 38B, 60A, and 60B are in communication. In this way, bolts 42A, 42B may be inserted through respectively first bolt apertures 38A, 38B of shoe pad 14A and respective second bolt apertures 38A, 38B of bracket 40A (74). In turn, shoe pad 14A may be secured to grouser 12A, bracket 40A may be held in an intended position relative to shoe pad 14A and grouser 12A, or the like. In some examples, bolts 42A, 42B may be threadably connected to threaded inserts 58A, 58B. In some such examples, bolts 42A, 42B may be threadably connected to threaded inserts 58A, 58B using a torque of greater than about 130 Newton-meters (Nm) (e.g., about 100 ft-lb). For example, may be threadably connected to threaded inserts 58A, 58B using a torque of greater than about 150 Nm (e.g., about 110 ft-lb) or greater than about 163 Nm (e.g., about 120 ft-lb). Moreover, in some examples, bolts 42A, 42B may be configured to engage with exterior side 13B of grouser 12A. In some such cases, bolts 42A, 42B may be rotated (e.g., to form the threaded connection) such that at least some of tip portions 62A, 62B engage with exterior side 13B.

In some examples, second bracket 40B may also be attached to shoe pad 14A and grouser 12A. In examples in which second bracket 40B is attached to shoe pad 14A and grouser 12A, bolts 42C, 42D may similarly be inserted through respective first bolt apertures 38C, 38D of shoe pad 14A and respective second bolt apertures 60C, 60D of bracket 40B. Moreover, in examples in which a plurality of shoe pads 14 are attached to a plurality of grousers 12 (e.g., of vehicle track 10), a plurality of brackets, and optionally a plurality of bolts, may be attached to the respective plurality of shoe pads 14 and plurality of grousers 12 of the vehicle track 10.

Various examples have been described. These and other examples are within the scope of the following claims.

What is claimed is:

1. An assembly comprising:
   a grouser defining an exterior side and an interior side;
   a shoe pad configured to contact the exterior side of the grouser, wherein an edge of the shoe pad defines a slot and a first bolt aperture in communication with the slot, the shoe pad including threads within the first bolt aperture, wherein the threads are configured to engage with a bolt; and
   a bracket comprising:
      a first arm configured to be inserted into the slot of the shoe pad, wherein the first arm defines a second bolt aperture configured to substantially align with the first bolt aperture of the shoe pad when the first arm is inserted into the slot to receive the bolt, and
      a second arm configured to contact the interior side of the grouser.

2. The assembly of claim 1, wherein the exterior side of the grouser comprises a first exterior side and the interior side of the grouser comprises a first interior side, the first exterior side comprising a first traction lug and a second traction lug and the shoe pad being configured to fit between the first and second traction lugs, and wherein the shoe pad further defines a second exterior side and a second interior side, wherein the second exterior side is configured to contact a ground surface and the second interior side is configured to contact the first exterior side of the grouser.

3. The assembly of claim 2, wherein the shoe pad further defines a first edge and a second edge opposite the first edge, a first axis extending between the first edge and the second edge, and wherein a width of the slot measured from the first edge along the first axis is 40 mm to 130 mm.

4. The assembly of claim 3, wherein a length of the slot extends along a second axis orthogonal to the first axis, and the length of the slot is 50 mm to 150 mm.

5. The assembly of claim 2, wherein a third axis extends between the second exterior side and the second interior side of the shoe pad, and wherein the slot is 10 mm to 50 mm from the second exterior side along the third axis.

6. The assembly of claim 2, further comprising the bolt configured to be inserted through the first bolt aperture of the shoe pad and the second bolt aperture of the bracket to secure the shoe pad to the grouser.

7. The assembly of claim 6, wherein a third axis extends between the second exterior side and the second interior side of the shoe pad, and the first bolt aperture extends along the third axis, and wherein a head of the bolt is configured to be within the shoe pad when the bolt is inserted through the first bolt aperture of the shoe pad and the second bolt aperture of the bracket to secure the shoe pad to the grouser.

8. The assembly of claim 6, wherein the bolt comprises a threaded bolt, and the shoe pad further comprises a threaded insert including the threads, the threaded insert being configured to form a threaded connection with the threaded bolt, wherein the threaded insert is positioned in the shoe pad and is communication with the slot.

9. The assembly of claim 6, wherein the bolt comprises a tip portion configured to engage with the first exterior side of the grouser when the bolt is inserted through the first bolt aperture of the shoe pad and the second bolt aperture of the bracket to secure the shoe pad to the grouser, and wherein the tip portion does not extend through the grouser to the first interior side of the grouser.

10. The assembly of claim 6, wherein the edge of the shoe pad comprises a first edge, the slot comprises a first slot, the bracket comprises a first bracket, and the bolt comprises a first bolt, wherein a second edge opposite of the first edge of the shoe pad defines a second slot and a third bolt aperture in communication with the second slot, and wherein the assembly further comprises:
    a second bracket comprising:
       a third arm configured to be inserted into the second slot of the shoe pad, wherein the third arm defines a fourth bolt aperture configured to substantially align with the third bolt aperture of the shoe pad when the third arm is inserted into the second slot, and
       a fourth arm configured to contact the first interior side of the grouser; and
    a second bolt configured to be inserted through the third bolt aperture of the shoe pad and the fourth bolt aperture of the bracket to secure the second edge of shoe pad to the grouser.

11. An endless track comprising:
    a plurality of grousers coupled together to form the endless track, wherein each grouser of the plurality of grousers defines an exterior side and an interior side; and
    a plurality of shoe pads, each shoe pad of the plurality of shoe pads defining a slot and a first bolt aperture in communication with the slot, wherein each shoe pad includes threads within the respective first bolt aperture, the threads being configured to engage with a bolt, and wherein each shoe pad is secured to a respective grouser of the plurality of grousers by a respective bracket comprising:
       a first arm configured to be inserted into the slot of the shoe pad, wherein the first arm defines a second bolt aperture configured to substantially align with the first bolt aperture of the respective shoe pad when the first arm is inserted into the slot to receive the bolt, and
       a second arm configured to contact the interior side of the respective grouser.

12. The endless track of claim 11, wherein the exterior side of each grouser comprises a first exterior side and the interior side of each grouser comprises a first interior side, the first exterior side comprising a first traction lug and a second traction lug and a shoe pad of the plurality of shoe pads being configured to fit between the first and second traction lugs of a respective grouser, and wherein each shoe pad further defines a second exterior side and a second interior side, wherein the second exterior side is configured to contact a ground surface and the second interior side is configured to contact the first exterior side of the respective grouser.

13. The endless track of claim 12, wherein each shoe pad further defines a first edge and a second edge opposite the first edge, and wherein a first axis extends between the first edge and the second edge, and wherein a width of the slot measured from the first edge along the first axis is 40 mm to 130 mm.

14. The endless track of claim 13, wherein a length of the slot extends along a second axis orthogonal to the first axis, and the length of the slot is 50 mm to 150 mm, and wherein a third axis extends between the second exterior side and the second interior side of the respective shoe pad, and wherein the slot is 10 mm to 50 mm from the second exterior side along the third axis.

15. The endless track of claim 11, wherein each shoe pad is secured to the respective grouser of the plurality of grousers by the bolt configured to be inserted through the first bolt aperture of the respective shoe pad and the second bolt aperture of the bracket, and wherein a head of the bolt is configured to be within the shoe pad when the bolt is inserted through the first bolt aperture of the shoe pad and the second bolt aperture of the bracket.

16. The endless track of claim 15, wherein the bolt comprises a threaded bolt, and each shoe pad comprises a threaded insert including the threads, the threaded insert being configured to form a threaded connection with the threaded bolt, wherein the threaded insert is positioned in the shoe pad and is communication with the slot.

17. The endless track of claim 15, wherein the bolt comprises a tip portion configured to engage with the exterior side of the respective grouser when the bolt is inserted through the first bolt aperture of the respective shoe pad and the second bolt aperture of the bracket to secure the respective shoe pad to the respective grouser, and wherein the tip portion does not extend through the respective grouser to the interior side of the grouser.

18. A method comprising:
   placing a shoe pad on an exterior side of a grouser, wherein the grouser defines the exterior side and an interior side, and wherein the shoe pad defines a slot and a first bolt aperture in communication with the slot, the shoe pad including threads within the first bolt aperture, wherein the threads are configured to engage with a bolt; and
   attaching a bracket to the shoe pad and the grouser, wherein the bracket comprises:
      a first arm configured to be inserted into the slot of the shoe pad, wherein the first arm defines a second bolt aperture configured to substantially align with the first bolt aperture of the shoe pad when the first arm is inserted into the slot to receive the bolt, and
      a second arm configured to contact the interior side of the grouser.

19. The method of claim 18, further comprising:
   inserting the bolt through the first bolt aperture of the shoe pad and the second bolt aperture of the bracket to secure the shoe pad to the grouser; and
   rotating the bolt relative to the shoe pad to threadably connect the bolt with the threads within the first bolt aperture of the shoe pad.

20. The assembly of claim 1, wherein the shoe pad defines the threads.

* * * * *